US012533695B2

(12) United States Patent
Greiner-Perth

(10) Patent No.: US 12,533,695 B2
(45) Date of Patent: Jan. 27, 2026

(54) PUMP DISPENSER HAVING A CAP UNIT

(71) Applicant: Aptar Radolfzell GmbH, Radolfzell (DE)

(72) Inventor: Jürgen Greiner-Perth, Gottmadingen (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 426 days.

(21) Appl. No.: 18/253,086

(22) PCT Filed: Nov. 2, 2021

(86) PCT No.: PCT/EP2021/080407
§ 371 (c)(1),
(2) Date: May 16, 2023

(87) PCT Pub. No.: WO2022/106193
PCT Pub. Date: May 27, 2022

(65) Prior Publication Data
US 2023/0415181 A1 Dec. 28, 2023

(30) Foreign Application Priority Data
Nov. 17, 2020 (EP) .................................... 20208186

(51) Int. Cl.
*B05B 11/00* (2023.01)
*B05B 11/10* (2023.01)

(52) U.S. Cl.
CPC ...... *B05B 11/0032* (2013.01); *B05B 11/1046* (2023.01)

(58) Field of Classification Search
CPC ........................ B05B 11/1046; B05B 11/0032
See application file for complete search history.

(56) References Cited

U.S. PATENT DOCUMENTS 4,353,483 A * 10/1982 Pehr .................... B65D 83/145 220/915
5,076,302 A 12/1991 Chari
(Continued)

FOREIGN PATENT DOCUMENTS

EP 0052990 A1 6/1982
JP 2111680 U 9/1990

OTHER PUBLICATIONS

European Search Report issued in corresponding European Application No. 20208186.5, with English translation of categories of cited documents, dated May 10, 2021 (11 pages).
(Continued)

*Primary Examiner* — Jeremy Carroll
(74) *Attorney, Agent, or Firm* — FLYNN THIEL, P.C.

(57) ABSTRACT

A pump dispenser including a liquid reservoir having a removal opening, and a pump device attached to the removal opening and having a push-actuator. The pump dispenser has a cap unit with a base element fastened to the liquid reservoir, and a cap element. The cap element is pivotable with respect to the base element by a hinge. In a closed state, the cap element covers the push-actuator and the discharge opening. The cap unit has a retaining device formed by retaining contours. A retaining contour of the base element is displaced by a release surface. The retaining device can alternatively or additionally include a lifting surface protected by a protective portion.

18 Claims, 9 Drawing Sheets

(56) References Cited

U.S. PATENT DOCUMENTS

| | | | | |
|---|---|---|---|---|
| 5,579,957 | A | 12/1996 | Gentile et al. | |
| 6,050,457 | A * | 4/2000 | Arnold | B05B 11/1018 222/321.9 |
| 6,247,613 | B1 * | 6/2001 | Meshberg | B05B 11/0037 222/321.9 |
| 8,662,353 | B2 | 3/2014 | Santoni et al. | |
| 9,834,341 | B2 | 12/2017 | Giraud et al. | |
| 10,322,856 | B2 | 6/2019 | Giraud et al. | |
| 2001/0020627 | A1 * | 9/2001 | Meshberg | B05B 11/1077 222/321.9 |
| 2002/0175137 | A1 | 11/2002 | Rousselet | |
| 2004/0262423 | A1 | 12/2004 | Cohen et al. | |
| 2006/0011660 | A1 | 1/2006 | Sandlin | |
| 2006/0137683 | A1 | 6/2006 | Anderson et al. | |
| 2008/0121661 | A1 | 5/2008 | Laidler et al. | |
| 2009/0140008 | A1 | 6/2009 | Welp | |
| 2009/0242502 | A1 | 10/2009 | Qin | |
| 2012/0110991 | A1 | 5/2012 | Ribera Turro et al. | |
| 2016/0145032 | A1 | 5/2016 | Fournet | |
| 2018/0133731 | A1 * | 5/2018 | Ritsche | B05B 11/0032 |

OTHER PUBLICATIONS

International Search Report, with English translation, issued in corresponding International Application No. PCT/EP2021/080407, date of mailing Feb. 10, 2022 (5 pages).

Written Opinion of International Searching Authority, issued in corresponding International Application No. PCT/EP2021/080407, date of mailing Feb. 10, 2022 (9 pages).

* cited by examiner

PUMP DISPENSER HAVING A CAP UNIT

FIELD OF APPLICATION AND PRIOR ART

The invention relates to a pump dispenser and the cap unit thereof. In particular, but not exclusively, the invention relates to dispensers which are configured for dispensing nicotine-containing liquids as smoke substitutes.

In dispensers of the type in question, the ability to use the dispensers in a simple and an almost subconscious manner is important. At the same time, however, such a dispenser should also be protected from access by children and/or from being inadvertently opened or even actuated, without this being allowed to impair significantly the ability to use the dispenser. Moreover, in such dispensers the production costs are of great relevance since dispensers according to the invention are preferably not refillable.

OBJECT AND SOLUTION

It is the object of the invention to provide a pump dispenser which provides a possibility for secure closing and simple opening with low production costs.

According to the invention, to this end a pump dispenser is primarily proposed for the discharge of liquids in atomized form, the pump dispenser comprising a liquid reservoir with a removal opening for containing the liquid before the discharge thereof and a pump device attached thereto. The liquid reservoir can be formed by a one-piece body. However, the liquid reservoir can also have separately an outer shell and an inner receptacle such as a bag. The volume of the liquid reservoir is preferably relatively small, since in many preferred fields of application the dispenser should be able to be carried in a trouser pocket. Preferably, the liquid reservoir can contain a maximum of 100 ml, in particular a maximum of 50 ml. Significantly smaller liquid reservoirs with a maximum capacity of 20 ml or less can also be expedient.

Liquid can be conveyed out of the liquid reservoir to a discharge opening via a push-actuator which can be depressed downwardly in a main direction of the pump dispenser. The discharge opening is preferably integrated in the push-actuator and preferably is perpendicular to the main direction defined by the actuating direction.

A pump device for a pump dispenser according to the invention generally comprises a pump chamber, the volume thereof being able to be reduced by depressing the push-actuator, and the pump chamber being connected via an inlet channel and an inlet valve to the liquid reservoir. Preferably, a pump device according to the invention has an outlet channel which leads to the discharge opening and in which an outlet valve is provided, the outlet valve being mechanically opened directly by pressure upstream or by depressing the push-actuator.

The pump dispenser has a cap unit with a base element, which is fastened to the liquid reservoir, and with a cap element which can be pivoted with respect to the base element by means of a joint. Preferably, a one-piece component made from plastics is provided, the component forming the base element and the cap element or substantial parts thereof in one piece, wherein the joint is also configured therebetween in one piece and preferably as a film hinge.

The base element surrounds an inner region in which a part of the pump device is arranged. In particular, the push-actuator of the pump device preferably protrudes through this region in order to be able to be actuated in the open state of the cap unit.

In a closed state, the cap element covers the push-actuator and the discharge opening and thus forms a protection against dirt penetrating from outside and/or residual liquid escaping from the cap interior. In the open state, the cap element uncovers the push-actuator and the discharge opening.

According to the invention, the pump dispensers are provided for applications in which they are carried by people in everyday use, in particular as pump dispensers for nicotine-containing or *cannabis*-containing liquids or as dispensers for hand disinfectants.

In order to ensure the uncomplicated use of the dispenser, and nevertheless to ensure a secure closed state, two designs which can also be implemented in combination are provided.

According to the first design, the cap unit comprises a retaining device opposite the joint for securing the closed state of the cap element, and on the side of the base element the retaining device has a first retaining contour and on the side of the cap element the retaining device has a second retaining contour. The retaining contours which face one another engage in one another in the closed state and, in particular, bring about a positive coupling. An outer release surface is provided on the side of the base element, the release surface in particular being preferably highlighted by color or, in particular, a haptically detectable shape, and the retaining contour of the base element being able to be displaced thereby at least in some portions and, in particular, being able to be radially pushed in, in order to be able to release thereby in particular the positive coupling, so that the cap element can then pivot open or automatically spring open depending on the design of the cap unit.

The retaining contours are preferably designed in the manner of an inner recess or a through-passage on the side of the cap element and an outwardly facing engagement projection on the side of the base element. The engagement projection is deflected radially inwardly by means of the release surface. In the closed state of the cap element, the engagement projection is positioned in the recess or in the through-passage. This leads to a positive coupling which preferably cannot be opened in a non-destructive manner, without previously deflecting the release surface.

Primarily, if the retaining device is to fulfill the function of child safety, it is preferably provided that the cap element cannot be opened in a non-destructive or destructive manner with a pulling force of less than 30 Newtons, without deflecting the release surface.

In particular, with a child-safe design of the retaining device, care should also be taken that the release surface is not able to be pushed in too easily. However, it is expedient to decouple the release surface slightly relative to the adjacent outer surfaces of the base element, for example by cut-outs on either side of the release surface and/or by the base element having a smaller average thickness in the region of the release surface than in adjacent regions of the outer surface.

In order not to have to press the release surface when closing, at least one of the retaining contours preferably comprises an insertion bevel, so that by closing the cap element the retaining contour on the base element is deflected inwardly thereby and finally springs into its latched position.

The second design, which can be combined with the first-described design, provides that on the side of the cap element the retaining device comprises a downwardly facing lifting surface. Corresponding thereto a protective portion is provided on the side of the base element, the protective portion covering the lifting surface when the cap element is closed and thereby preventing a vertical and upwardly oriented action of force which pivots open the cap element, so that an inadvertent opening is unlikely. Similar to the aforementioned release surface, the protective portion is also preferably highlighted by color or regarding its shape, for example by being provided with a profiled portion. The protective portion is configured to withstand a vertical application of force or at least to protect the lifting surface thereagainst. However, at the same time the protective portion can be pushed in radially by means of a finger, and in particular the thumb, as intended, so that the lifting surface is gripped from below by the finger and then the lifting surface can be pushed upwardly by means of the finger.

In this second design, in particular, it can be provided that no positively acting retaining contours which correspond to the first design are provided. Rather, it can be provided that in the closed state the cap element and the base element are subjected only to a non-positively acting coupling. In one possible combination with the first design, however, it might preferably be provided that the protective portion represents at the same time the release surface for the decoupling.

The lifting surface should not be sharp-edged, if possible, in order to permit easy opening. In particular, the lifting surface is preferably designed to be planar or configured to be bulged only to a small extent in a convex or concave manner. As already described, this lifting surface is made accessible by pushing in the protective portion. The protective portion is preferably sufficiently freely displaceable that it releases at least one portion of the lifting surface to a width of 1.5 mm of the lifting surface, by means of a radially oriented actuating force of 10 Newtons. Relative to the surface area, such an actuating force preferably leads to the release of a portion of the lifting surface of at least 10 $mm^2$, in particular preferably of at least 20 $mm^2$.

A protective portion in the form of a bridge element, which is integrally formed on the end side on adjacent portions of the base element and cut out to the side, has shown to be particularly advantageous. Such a bridge shape represents an effective protection against deformation in the direction of the lifting surface and can be configured very effectively for achieving a desired resistance of the portion against radial deformation.

The lifting surface can be formed directly by a lower edge of the cap element. Since such an edge is generally not sufficiently wide on its own to permit easy opening, it is regarded as preferred if the lifting surface is also formed at least by the lower face of a horizontal lifting projection protruding outwardly from a cap region of the cap element. This can be provided peripherally, but is preferably provided on only one side on the cap element.

The base element of the cap unit is indirectly or directly coupled to the liquid reservoir, for example via a snap connection, which preferably produces a high degree of resistance against separation, so that children are not able to separate the entire cap unit from the liquid reservoir.

A structural option provides that the pump device is fastened to the liquid reservoir by means of a crimp sleeve, and the snap connection serves the purpose of securing the base element to this crimp sleeve.

A further aspect of the invention relates to a pump dispenser, in particular of the described type, in which the aforementioned crimp sleeve is dispensed with, and instead it is provided that the base element is provided for direct fastening to the liquid reservoir and comprises a retaining surface facing in the direction of the removal opening of the liquid reservoir, the pump device being secured thereby to the liquid reservoir, in particular being clamped between the liquid reservoir and the base element, optionally by adding a sealing ring between the liquid reservoir and the housing of the pump device.

The base element of the cap unit thus fulfils a further function here, by fixing the pump device to the liquid reservoir. A dispenser according to the invention can thus consist of a very small number of components, in addition to the pump device. In an extreme case, there is only the liquid reservoir, a one-piece cap unit and optionally a sealing ring between the pump device and a removal opening of the liquid reservoir.

Preferably, the pump device comprises an outer peripheral collar which in turn bears against an edge surrounding the removal opening or a sealing ring at that point. The retaining surface of the base element presses this collar in the direction of the liquid reservoir.

The retaining surface is preferably configured in the form of an annular surface, a stop surface which limits the mobility of the push-actuator being provided opposite the retaining surface.

As already explained above, the base element preferably serves for fastening to the liquid reservoir and as a support for the described release surface and/or the described protective portion.

In order to be able to fulfill these two functions, the base element preferably comprises an inner shell, a clamping device being provided on the inner face thereof for fastening the base element to the liquid reservoir, and an outer shell on which the release surface or the protective portion is provided. The inner shell can be subdivided by axial cuts into tongue portions which are latched as intended to the described crimp sleeve or directly to an outlet of the liquid reservoir, by being distributed over the periphery.

When the cap unit is in the closed state, the cap element preferably bears substantially over the periphery with a lower terminal edge against an upper terminal edge of the base element. In a particularly simple design, this upper terminal edge can run in a uniform plane which is oriented at right-angles to the main direction of the dispenser.

It is preferred, however, if the upper terminal edge has a non-uniform extent in the direction of the cap element relative to the main direction. Thus the terminal edge can extend, in particular, further upwardly in a joint region of the terminal edge than in an actuating region of the terminal edge which is gripped by a user for actuating the push-actuator. This actuating region, which is preferably offset by 90° relative to the joint region, permits thereby a simpler actuation of the push-actuator and as a whole a shorter design of the dispenser. The terminal edge can also extend further upwardly in a joint region of the terminal edge than in a discharge region of the terminal edge, the discharge opening being oriented in the direction thereof or in the case of a rotatable push-actuator being able to be aligned with the discharge opening. The resulting recessed terminal edge in the region of the discharge opening also serves for achieving a short design of the dispenser.

As also described regarding the joint region, it is also advantageous if the terminal edge extends further upwardly in a retaining region opposite the joint region than in the aforementioned actuating region and/or in the aforementioned discharge region of the terminal edge.

Preferably, the base element and the cap element are provided in the region of the terminal edges with cooperating structures, in particular with at least one elevation and a corresponding recess, in the closed state the base element and the cap element being positively secured thereby to one another relative to a radial direction. This facilitates, in particular, the automated assembly of the dispenser and also the subsequent manual handling when using the dispenser.

The structures preferably extend over an angle of at least 90° on the base element and on the cap element, in particular, preferably over an angle of at least 120°.

One possible design of the dispenser provides that it has a substantially rotationally symmetrical outer shape, wherein in this case preferably over the majority of the length it has a circular cylindrical shape which optionally is rounded or tapers at the ends.

For a regular operation of the dispenser, in particular an operation which can frequently take place almost subconsciously, it has proved to be advantageous if the base element or the entire cap element or the entire dispenser has an outer contour which deviates from a circular shape relative to a projection in the main direction. Such a base element or such a cap unit is thus flattened over its entire length, wherein the outer contour preferably has a substantially rectangular or oval shape in cross section. Preferably, the liquid dispenser is flattened to the same extent.

Such a flattened design is able to be used in a particularly simple manner without visually checking the alignment. In particular, the outer contour of the base element can have a smaller extent in the direction of a discharge direction defined by the discharge opening than in a direction at right-angles thereto and relative to the main direction. The joint in such a case is preferably provided on one of the short sides of the base element. This provides a particularly ergonomic operation in which the liquid reservoir is gripped by the hand, the cap element is released by the thumb and the push-actuator is then depressed with the index finger. In order to be operated equally for both left-handed and right-handed use, the dispenser is preferably configured correspondingly symmetrically.

The operation without the user visually checking the alignment can also be improved, in particular, by the already described haptic detectability of the release surface and/or the protective portion, for example with a profiled portion, such as raised ribs on the release surface or the protective portion.

The pump dispensers according to the invention can be used as medication dispensers. The liquid reservoir can be filled, for example, with a painkiller, such as lidocaine which is taken orally.

In particular, the field of application for discharging a nicotine-containing or *cannabis*-containing liquid for oral consumption is regarded as an essential field of application. A pump dispenser according to the invention which can be produced very advantageously and with a high degree of safety, also regarding child safety, in particular also with simple handling, is particularly well suited for this field of application, since acceptance by the user is important when used as a smoke substitute.

A further important field of application is the field of disinfectant dispensers, in particular for hand disinfectant, and other dispensers which are provided for the topical application of liquids on the skin of the user.

Applications in which the atomized liquid is not consumed or applied to the skin, but for example is applied to the surface of objects, are also possible by means of a pump dispenser according to the invention and are encompassed by the invention.

BRIEF DESCRIPTION OF THE DRAWINGS

Further advantages and aspects of the invention are found in the claims and the following description of preferred exemplary embodiments of the invention which are explained hereinafter with reference to the figures.

DETAILED DESCRIPTION OF THE EXEMPLARY EMBODIMENTS

Figure 1:
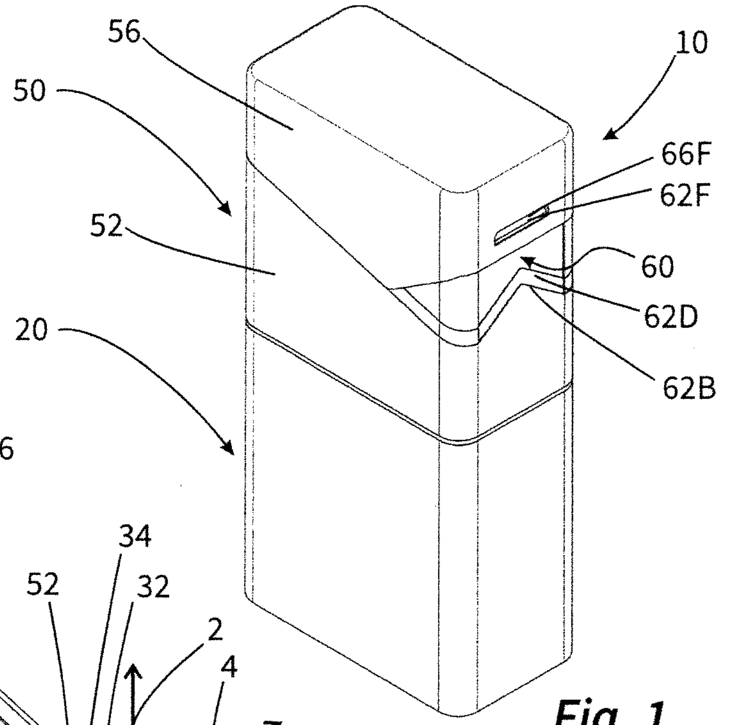
FIGS. 1 to 3 show a first exemplary embodiment of a pump dispenser according to the invention in the closed and open state and in a sectional view.

FIGS. 1 to 13C show a total of four exemplary embodiments of a pump dispenser 10 according to the invention which all have the following features.

In each case the pump dispensers 10 are carried as intended by people in everyday life, for example in order to carry disinfectant or a nicotine-containing smoke substitute product. The dispensers in each case have a liquid reservoir 20 with, for example, a 20 ml internal volume, a cap unit 50 being provided on the removal opening 22 thereof. This cap unit 50 consists in turn of a base element 52, a pivotable cap element 56 being attached thereto via a joint 54. In the exemplary embodiments set forth, the base element 52 and the cap element 56 are always part of a one-piece component which also forms the joint 54 which is configured as a film hinge.

In all four exemplary embodiments it is also provided that the base element 52, which is fixedly attached to the liquid reservoir 20 by means of a clamping device 52C of an inner shell 52B, has a central through-passage through which a pump device 30 protrudes, wherein in particular exclusively a push-actuator 32 of the pump device 30 with a discharge opening 34 provided thereon protrudes out of the through-passage in the base element 52.

Figure 3:
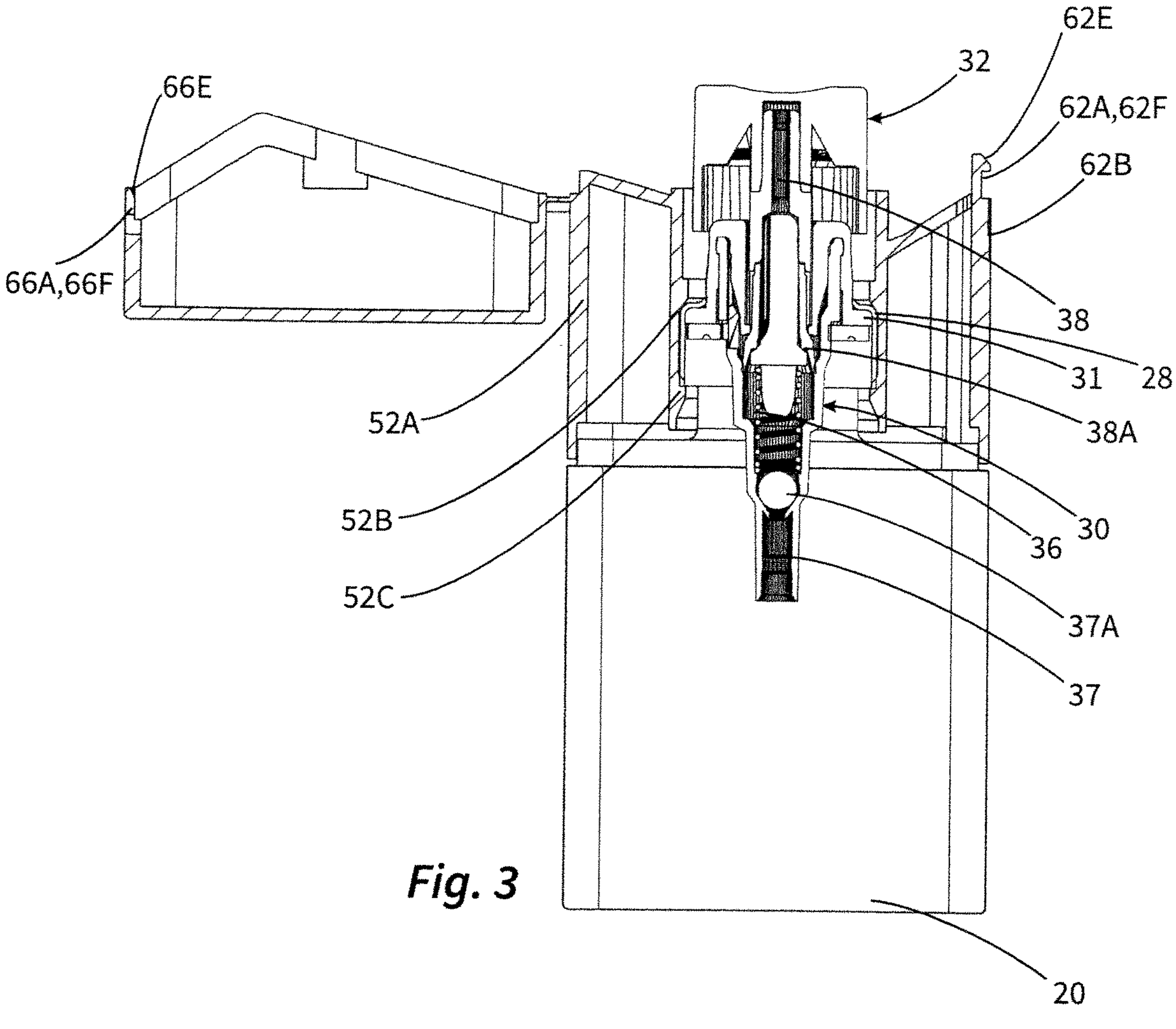

As can be identified by way of FIG. 3, as representative for all of the exemplary embodiments, the pump device 30 has a housing with a collar 31 which bears against a seal on an edge of the removal opening 22. The pump device also has a pump chamber 36, the volume thereof being able to be reduced by depressing the push-actuator 32 against the force of a spring. An inlet channel 37 with an inlet valve 37A connects the pump chamber to the liquid reservoir 20. An outlet channel 38 with an outlet valve 38A connects the pump chamber to the discharge opening 34.

The intended use of the dispensers provides that, for the purpose of being used, the dispenser is initially opened in a manner described in more detail below, by the previously closed cap element 56 being pivoted open so that the push-actuator 32 is then depressed in a dispenser main direction 2 and thereby liquid can be discharged through the discharge opening in a discharge direction 4. The liquid is atomized at the same time into fine droplets as intended.

Figure 2:
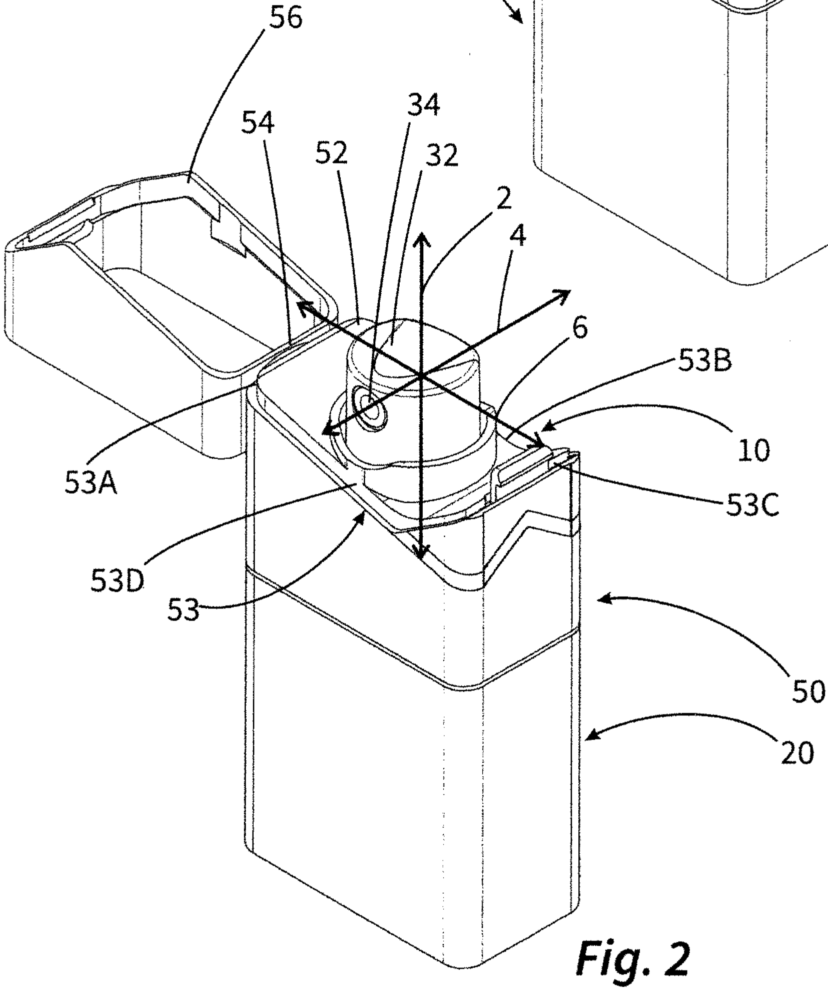

In the design according to FIGS. 1 to 3, the dispenser has an approximately rectangular flattened cross-sectional shape on the liquid reservoir 20, on the base element 52 and/or the outer shell 52A thereof and on the cap element 56, the short sides thereof running approximately parallel to the discharge direction 4 and the long sides thereof running approximately parallel to the transverse direction 6. It should be mentioned that the discharge direction 4 indicated in the drawings represents the preferred alignment, but the push-actuator 32 with the discharge opening 34 can also be rotatable, depending on the design, in particular to permit a rotation by 180° for left-handed users.

The joint 54 and a retaining device 60 for the secure closing of the cap unit 50 are provided on the opposing short sides of this rectangular shape. The push-actuator 32 and the discharge opening 34 are aligned such that the discharge takes place in the direction of one of the long sides and is triggered by depressing over the opposing long side of the aforementioned rectangular shape.

The terminal edge 53 which terminates the base element 52 at the top on the edge, and against which the cap element 56 bears in the closed state, has a relatively complex shape. This terminal edge is configured to be highest on the short sides in the joint region 53A and in the opposing retaining region 53C. On the long sides of the aforementioned rectangular shape in the actuating region 53B and in the discharge region 53D, however, the terminal edge is partially lowered so that with a short design of the dispenser a comfortable actuation is possible and the safe discharge of liquid ensured.

In the closed state, which is shown in FIG. 1, an engagement projection 62F of a retaining contour 62A on the base element side engages in a through-passage 66F of a retaining contour 66A of the cap element 56. The engagement projection 62F is provided at the upper end of a release surface 62B which advantageously can be relatively easily pushed in. The release surface 62B can be easily detected haptically by means of profiled portions 62D. By deflecting the engagement projection 62F by means of the release surface 62B this engagement portion is pulled out of the through-passage 66F so that, in particular the thumb, by means of which the release surface 62B has been pushed in, grips below the cap element 56 and pushes it upwardly to pivot it open. Thus the open state is reached. Insertion bevels 62E, 66E assist when closing the cap element 56, in order to produce the latched closed state without difficulty.

Figure 4:
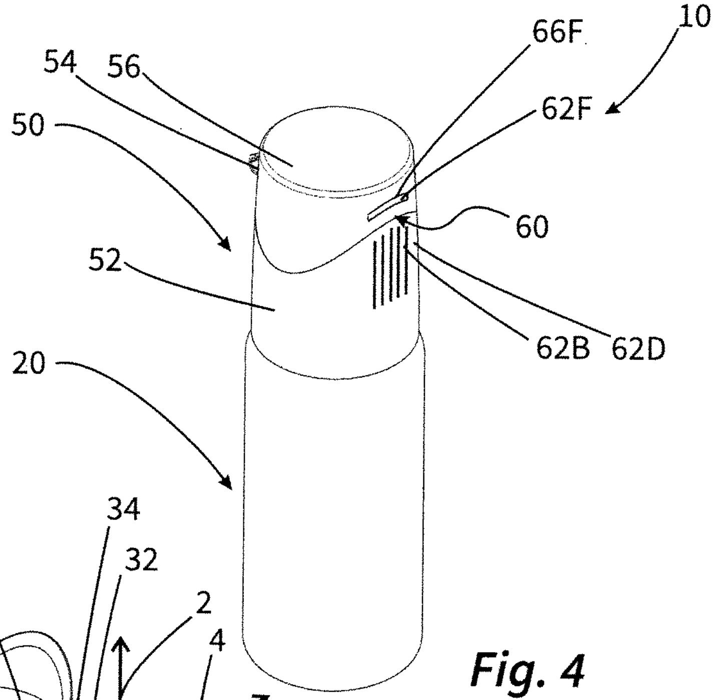
FIGS. 4 to 6 show a second exemplary embodiment of a pump dispenser according to the invention in the closed and open state and in a sectional view.
Figure 5:
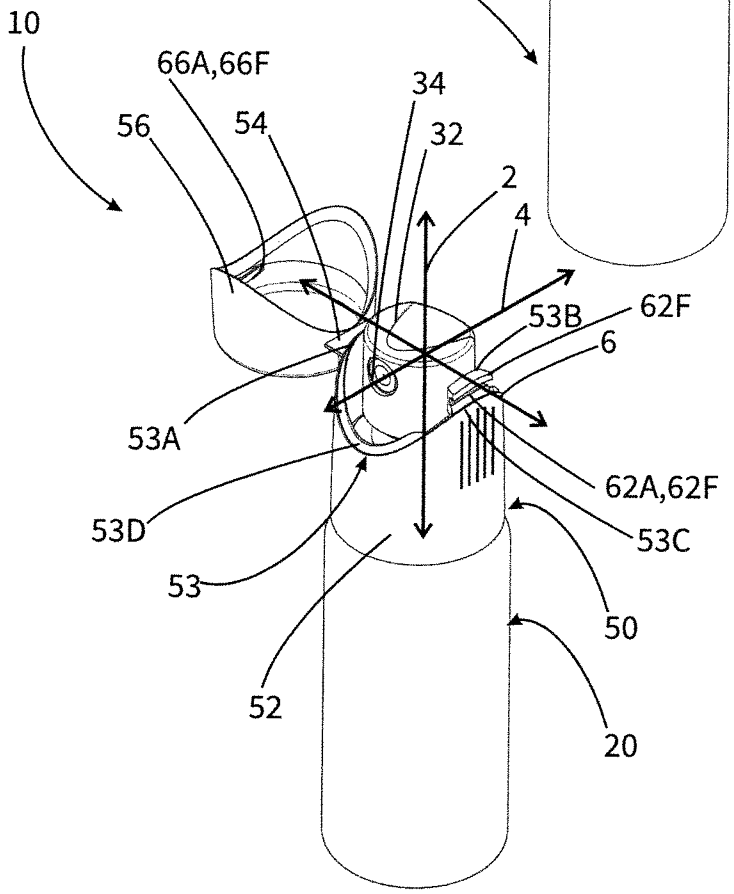
Figure 6:
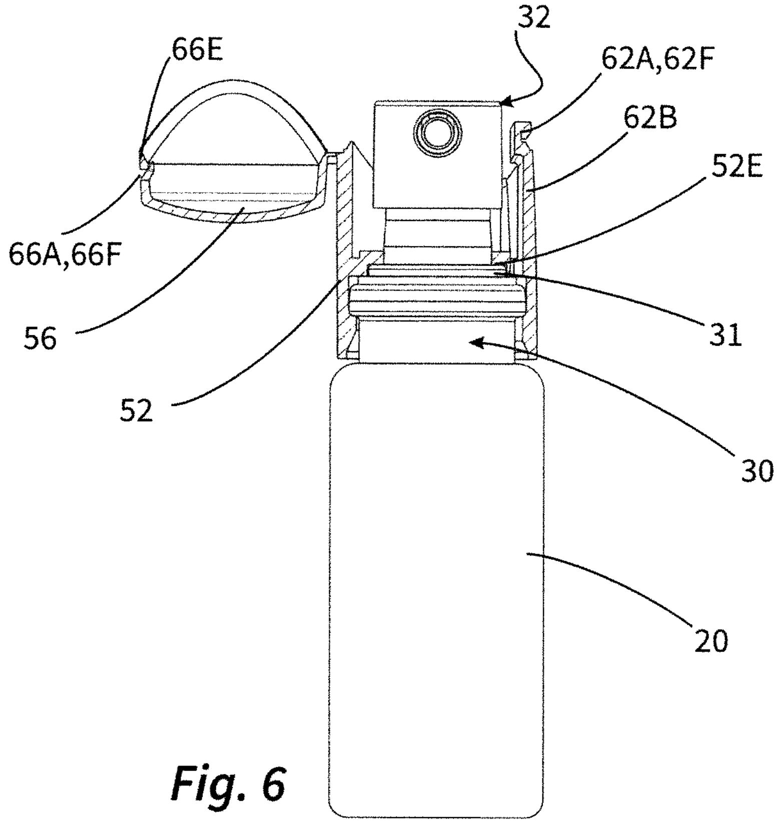

The embodiment of FIGS. 4 to 6 is characterized by an approximately circular cylindrical shaping of the cap unit 50 and also by a similarly circular cylindrical shaping of the liquid reservoir 20. Regarding the functionality, however, the dispenser 10 of FIGS. 4 to 6 can be substantially compared with those of FIGS. 1 to 3. In a similar manner as described above, the terminal edge 53 is designed with different heights on the base element 52. The retaining contours 62A, 66A are also configured in a similar manner to the previous exemplary embodiment.

Deviating from the previous exemplary embodiment, however, it is provided that the base element 52 is fastened directly onto a neck of the liquid reservoir 20, instead of onto a crimp sleeve 28 as is provided in the design of FIGS. 1 to 3. The pump device 30 is secured onto the liquid reservoir 20 by means of the base element 52 and without an additional crimp sleeve 28. To this end, a retaining surface 52E pushes from above against the collar 31 of the pump housing and pushes this collar against the edge of the removal opening 22.

Figure 7:
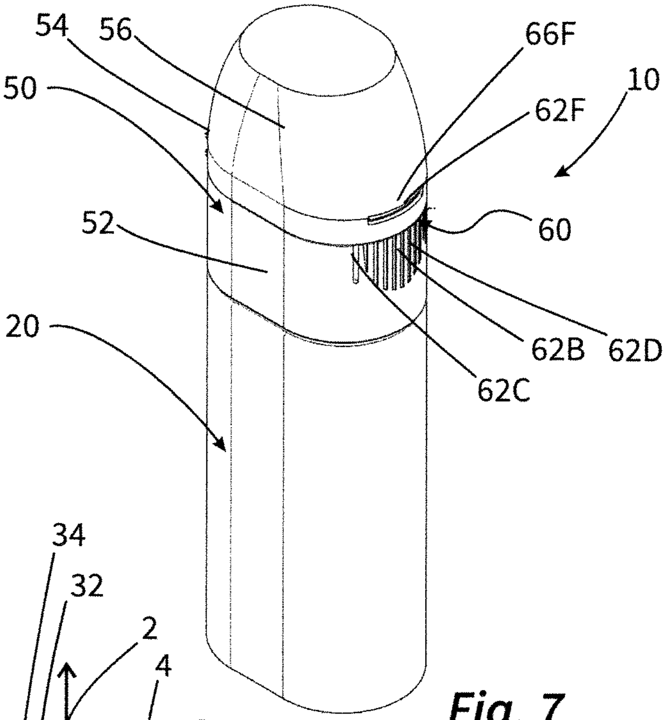
FIGS. 7 to 9 show a third exemplary embodiment of a pump dispenser according to the invention in the closed and open state and in a sectional view.
Figure 8:
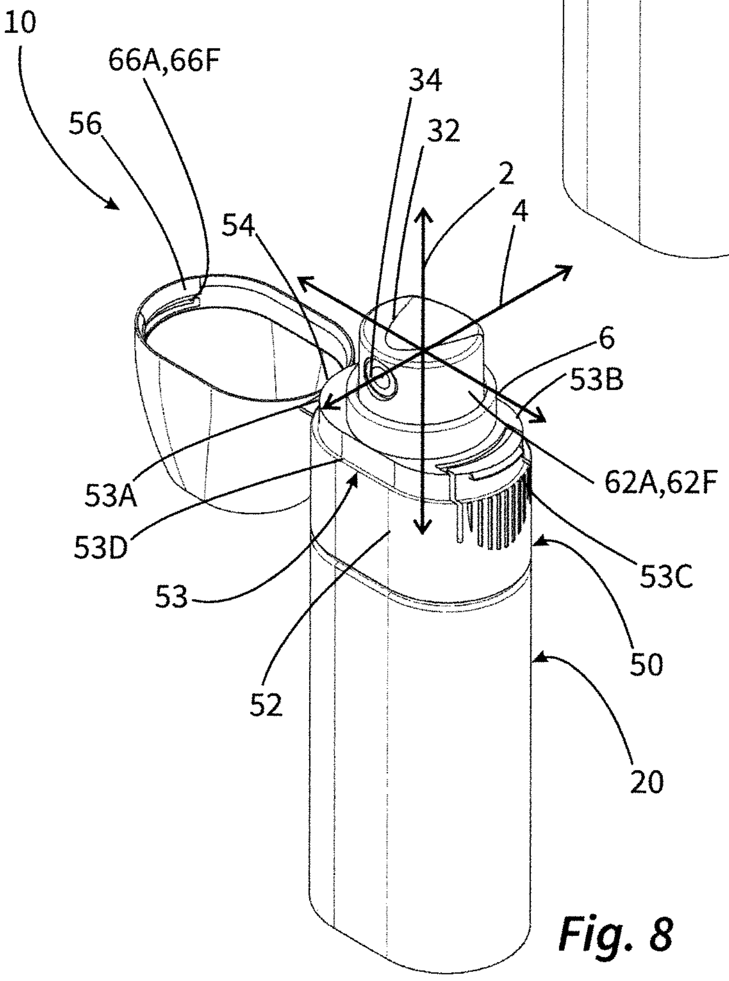
Figure 9:
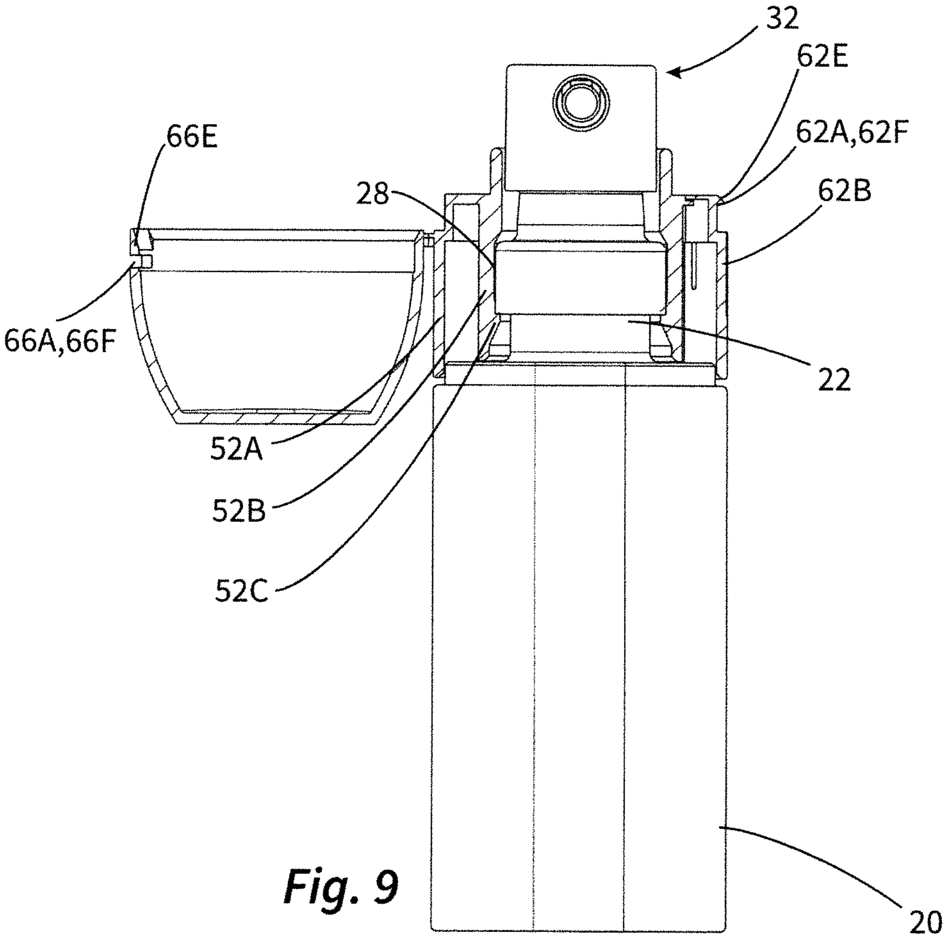

In the exemplary embodiment of FIGS. 7 to 9, the principal functionality is once again similar to that of FIGS. 1 to 3. A flattened shaping of the dispenser is also implemented here, the cross section thereof having a substantially oval shape, however. It is also provided here as a particularity that the release surface 62B is designed to be able to be relatively easily pushed in by means of cut-outs 62C.

Figure 10:
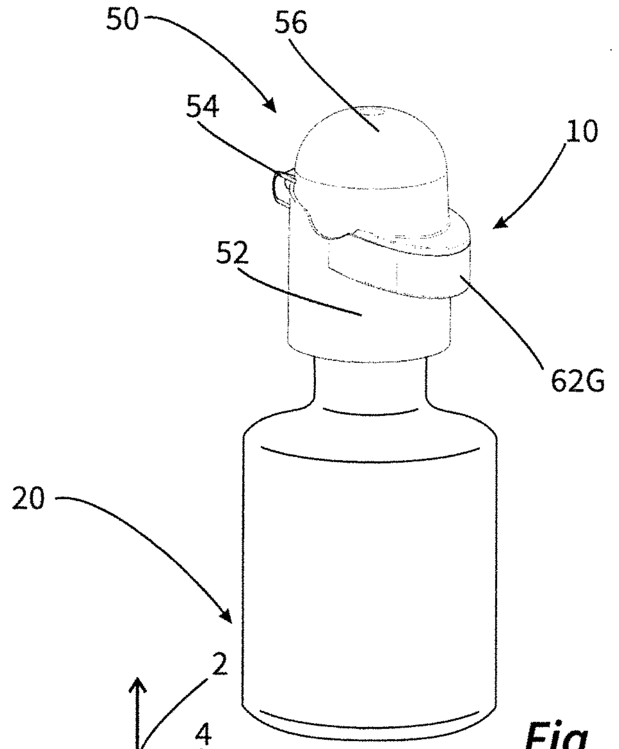
FIGS. 10 to 12 show a fourth exemplary embodiment of a pump dispenser according to the invention in the closed and open state and in a sectional view.
Figure 11:
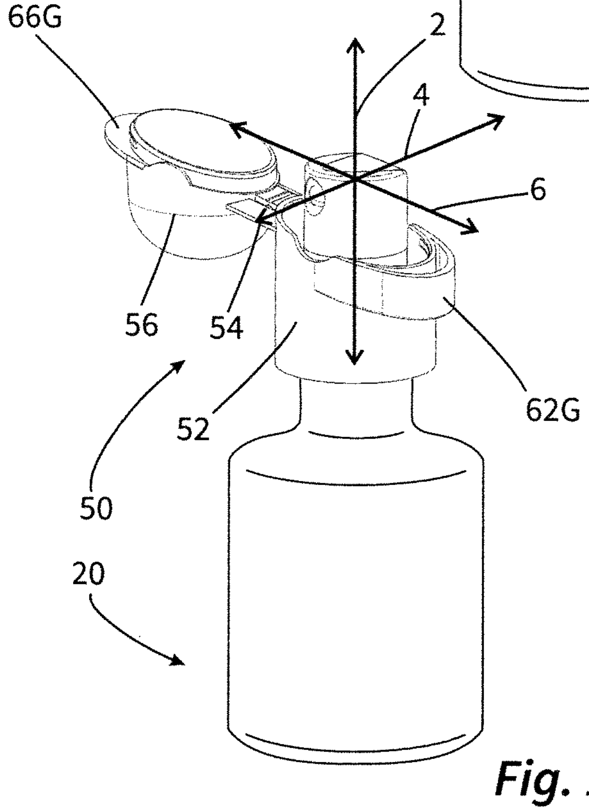
Figure 12:
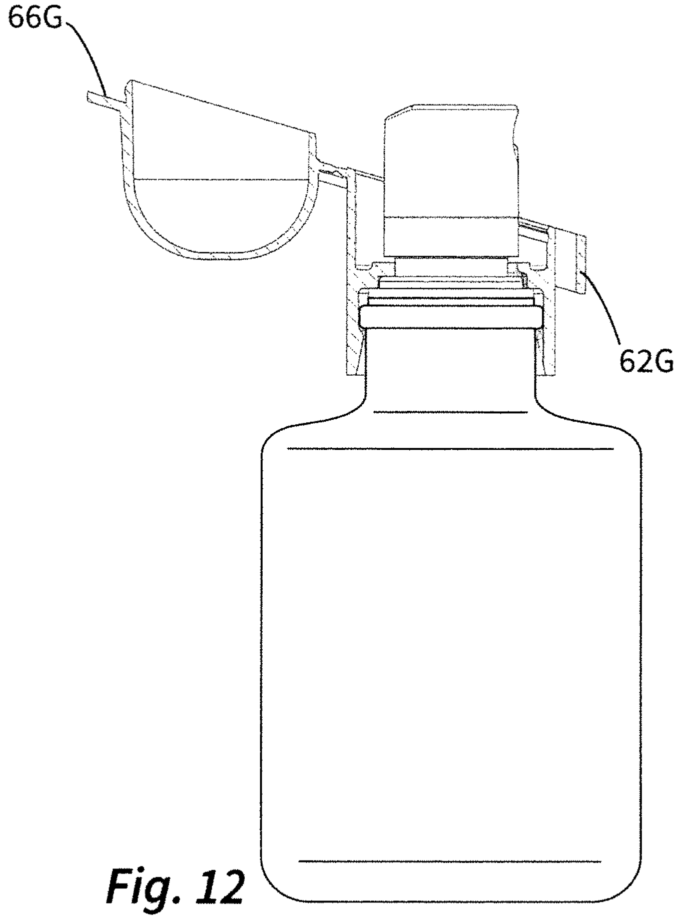

A slightly different technique is provided for the dispenser of FIGS. 10 to 12, since no retaining contours 62A, 66A which would positively engage in one another are provided here. Rather, in the closed state the cap element 56 is connected to the base element 52 simply by being slightly clamped, so that it can be opened only by a force facing in the pivoting-open direction.

In order to ensure with such a design that the cap element 56 is not inadvertently opened, but can still be easily opened, a lifting surface 66G is provided on the outer face on the cap element 56, the lifting surface being covered protectively by a bridge-like protective portion 62G which is fastened on the end side to the base element 52. In the non-pushed in state, this protective portion 62G has dimensions by which the lifting surface 66G is covered and thus not inadvertently lifted by a force from below. This can be identified, in particular, in FIG. 10.

Figure 13A:
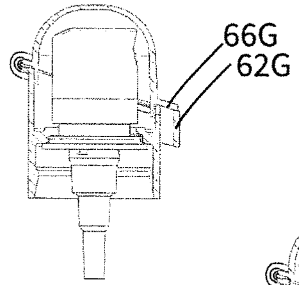
FIGS. 13A to 13C show the process of opening the fourth exemplary embodiment.
Figure 13B:
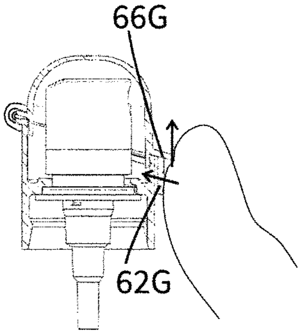
Figure 13C:
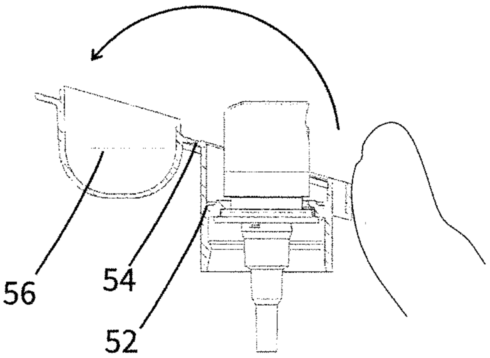

In order to lift the cap element 56, the procedure is as illustrated in FIGS. 13A to 13C. The protective portion 62G is radially pushed in by means of a finger, in particular the thumb, for example by approximately 2 mm. Due to the bridge-like design this is possible by a force which can be structurally well defined. Preferably, the protective portion can be pushed in by 1.5 mm by a force of 10 Newtons. By being pushed in, the lifting surface 66G or a part thereof is released, so to speak. By pushing the thumb upwardly then force can be applied to the lifting surface and thus the cap element 56 can be pivoted open. The arrows in FIG. 13B illustrate the movement. The arrow in FIG. 13C illustrates the subsequent pivoting open, which preferably can occur abruptly due to a pretensioning of the joint 54.

Figure 14:
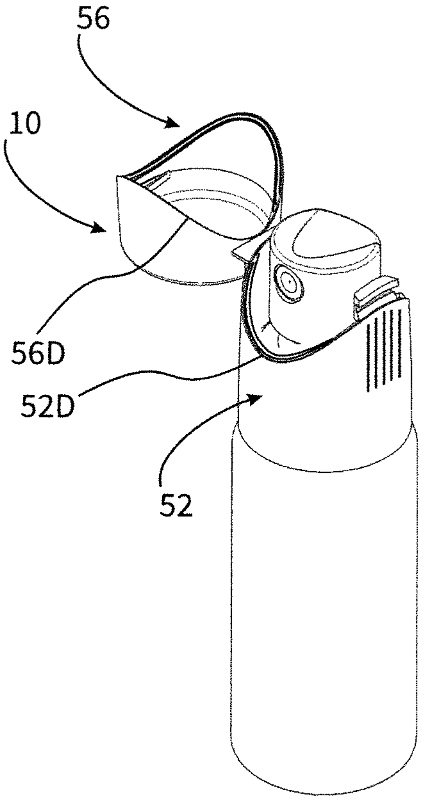
FIGS. 14 and 14A and 14B show a particular design of the terminal edges on the base element and on the cap element of the pump dispenser according to the invention.
Figure 14A:
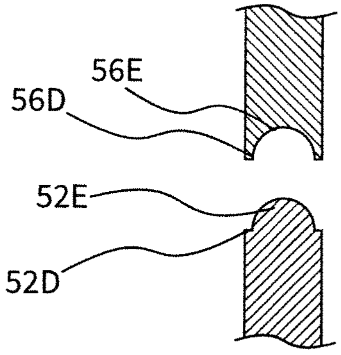

FIGS. 14 and 14A illustrate a particular shaping on lateral surfaces of the base element 52 and the cap element 56 which bear against one another in the closed state. The design of the lateral surfaces on a dispenser 10 corresponding to FIGS. 4 to 6 is shown by way of example. However, the design could also be used in a different type of dispenser according to the invention.

In the manner shown in FIG. 14A, the lateral surfaces do not have any planar terminal edges 52D, 56D but are configured with an engagement structure 56E, 52E on the terminal edges 52D, 56D. In the present case, a partial or substantially peripheral central elevation is provided on the terminal edge 52D of the base element 52 and a partial or substantially peripheral groove 56E is provided on the terminal edge 56D of the cap element 56.

Figure 14B:
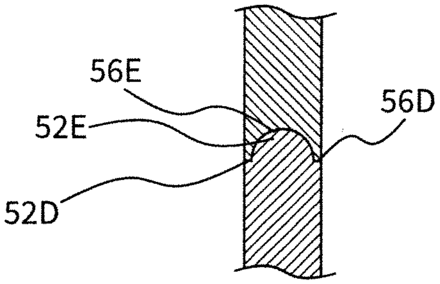

As illustrated in FIG. 14B these structures 52E, 56E engage in one another in the closed state of the dispenser 10 and lead to a positive connection relative to a radial direction. The dispenser 10 is more securely closed thereby.

The structures 52E, 56E, however, are also advantageous regarding the automated assembly of the dispensers. The risk is reduced that the walls of the cap element and the base element slide past one another in an automated assembly step in which the dispenser is closed by pivoting the cap element.

The invention claimed is:

1. A pump dispenser for discharge of liquid in atomized form, comprising:

a liquid reservoir for containing liquid before discharge, the liquid reservoir having a removal opening;

a pump device attached to the removal opening and having a push-actuator depressible downwardly in a main direction of the pump dispenser and by which liquid can be conveyed out of the liquid reservoir to a discharge opening; and a cap unit with a base element fastened to the liquid reservoir, and a cap element pivotable with respect to the base element by a joint, wherein in a closed state the cap element covers the push-actuator and the discharge opening and in an open state the cap element uncovers the push-actuator and the discharge opening, the cap unit comprising a retaining device opposite the joint for securing the closed state of the cap element, wherein on a side of the base element the retaining device has a retaining contour and on a side of the cap element the retaining device has a retaining contour which engage in one another in the closed state of the cap element, and wherein the retaining device on the side of the base element has a release surface, by which the retaining contour of the base element is able to be displaced.

2. The pump dispenser as claimed in claim 1, wherein the retaining contour of the cap element comprises an inner recess or a through-passage, and the retaining contour of the base element comprises an outwardly facing engagement projection deflectable inwardly by the release surface and the engagement projection in the closed state of the cap element is positioned in the inner recess or in the through-passage.

3. The pump dispenser as claimed in claim 1, having at least one of the following further features:

the release surface is separated by cut-outs on either side relative to adjacent outer surfaces of the base element; and/or the base element comprises a peripheral outer surface having a smaller average thickness in a region of the release surface than in adjacent regions of the outer surfaces; and/or the release surface comprises an outer profiling; and/or at least one of the retaining contours on the base element and on the cap element comprises an insertion bevel such that by closing the cap element the retaining contour on the base element is deflected inwardly; and/or the retaining contours on the base element and on the cap element in the closed state are positively connected; and/or the base element comprises an inner shell, a clamping device provided on an inner face of the inner shell for fastening the base element to the liquid reservoir, and an outer shell, the release surface being provided on the outer shell.

4. The pump dispenser as claimed in claim 1, wherein the base element is fastened to the liquid reservoir and comprises a retaining surface facing in a direction of the removal opening of the liquid reservoir, the pump device being secured by the retaining surface to the liquid reservoir.

5. The pump dispenser as claimed in claim 4, having at least one of the following further features:

the pump device comprises an outer peripheral collar, the retaining surface of the base element bearing against the outer peripheral collar; and/or a stop surface of the base element opposite the retaining surface limits a mobility of the push-actuator.

6. The pump dispenser as claimed in claim 1, wherein the base element comprises an upper terminal edge, the cap element in the closed state bearing against the upper terminal edge, and the terminal edge has a non-uniform extent in the direction of the cap element relative to the main direction.

7. The pump dispenser as claimed in claim 6, having at least one of the following features:

the terminal edge extends further upwardly in a joint region of the terminal edge than in an actuating region of the terminal edge, the actuating region being gripped by a user for actuating the push-actuator; and/or the terminal edge extends further upwardly in a joint region of the terminal edge than in a discharge region of the terminal edge, the discharge opening being oriented in the direction of the discharge region; and/or the terminal edge extends further upwardly in a retaining region of the terminal edge opposite the joint region than in an actuating region of the terminal edge, the actuating region being gripped by a user for actuating the push-actuator; and/or the terminal edge extends further upwardly in a retaining region of the terminal edge opposite the joint region than in a discharge region of the terminal edge, the discharge opening being oriented in the direction of the discharge region.

8. The pump dispenser as claimed in claim 1, wherein the pump device comprises a pump chamber, a volume of the pump chamber being reduced by depressing the push-actuator, and the pump chamber being connected via an inlet channel to the liquid reservoir and via an outlet channel to the discharge opening, and a valve is arranged in each of the inlet channel and the outlet channel.

9. The pump dispenser as claimed in claim 1, wherein the base element has an outer contour deviating from a circular shape relative to a projection in the main direction.

10. The pump dispenser as claimed in claim 9, wherein the outer contour of the base element has a smaller extent in a discharge direction defined by the discharge opening than in a direction at right-angles thereto and relative to the main direction, and the outer contour has a substantially rectangular shape or a substantially oval shape.

11. The pump dispenser as claimed in claim 1, having at least one of the following further features:

the base element and the cap element are configured at least in some portions by a one-piece component, the one-piece component forming the joint between the base element and the cap element; and/or the base element and the cap element are provided in a region of terminal edges with structures, in the closed state the base element and the cap element being positively secured by the structures to one another in a radial direction; and/or the base element is connected by a snap connection to the liquid reservoir or to a crimp sleeve fixing the pump device to the liquid reservoir; and/or the liquid reservoir has an internal volume of a maximum of 100 ml.

12. The pump dispenser as claimed in claim 1, wherein the reservoir of the liquid dispenser is filled with one of the following: a medication; a nicotine-containing or cannabis-containing liquid; or a disinfectant.

13. The pump dispenser as claimed in claim 1, wherein on the side of the cap element the retaining device comprises a downwardly facing lifting surface and on the side of the base element the retaining device comprises a protective portion which protects the lifting surface from below against an action of force when the cap element is closed, and the protective portion can be pushed in radially by a finger so that force can subsequently be applied to the lifting surface by the finger and the cap element is thereby pivotable.

14. The pump dispenser as claimed in claim 13, having at least one of the following further features:

the protective portion is configured such that at least one portion of the lifting surface of 1.5 mm width is released by an actuating force of 10 Newtons; and/or the protective portion and the shape of the lifting surface are configured such that at least one portion of the lifting surface of 10 $mm^2$ width is released by an actuating force of 10 Newtons.

15. The pump dispenser as claimed in claim 13, having at least one of the following further features:

the lifting surface is planar or bulged; and/or the lifting surface is formed by a lower face of a horizontal lifting projection protruding outwardly from a cap region of the cap element; and/or the protective portion is configured as a bridge element integrally formed on an end side on adjacent portions of the base element and cut out to the side.

16. A pump dispenser for discharge of a liquid in atomized form, comprising:

a liquid reservoir for containing liquid before discharge, the liquid reservoir having a removal opening;

a pump device attached to the removal opening and having a push-actuator depressible downwardly in a main direction of the pump dispenser and by which liquid can be conveyed out of the liquid reservoir to a discharge opening; and a cap unit with a base element fastened to the liquid reservoir, and a cap element pivotable with respect to the base element by a joint, wherein in a closed state the cap element covers the push-actuator and the discharge opening and in an open state the cap element uncovers the push-actuator and the discharge opening, the cap unit comprising a retaining device opposite the joint for securing the closed state of the cap element, wherein on a side of the cap element the retaining device comprises a downwardly facing lifting surface and on a side of the base element the retaining device comprises a protective portion which protects the lifting surface from below against an action of force when the cap element is closed, and the protective portion can be pushed in radially by a finger such that force can be subsequently applied to the lifting surface by the finger and the cap element is thereby pivotable.

17. The pump dispenser as claimed in claim 16, having at least one of the following further features:

the protective portion is configured such that at least one portion of the lifting surface of 1.5 mm width is released by an actuating force of 10 Newtons; and/or the protective portion and the shape of the lifting surface are configured such that at least one portion of the lifting surface of 10 $mm^2$ width is released by an actuating force of 10 Newtons.

18. The pump dispenser as claimed in claim 16, having at least one of the following further features:

the lifting surface is planar or bulged; and/or the lifting surface is formed by a lower face of a horizontal lifting projection protruding outwardly from a cap region of the cap element; and/or the protective portion is configured as a bridge element integrally formed on an end side on adjacent portions of the base element and cut out to the side.

* * * * *